Jan. 19, 1943.  L. J. ST. CLAIR  2,308,569
TOOL AND METHOD FOR MAKING THE SAME
Filed July 21, 1941
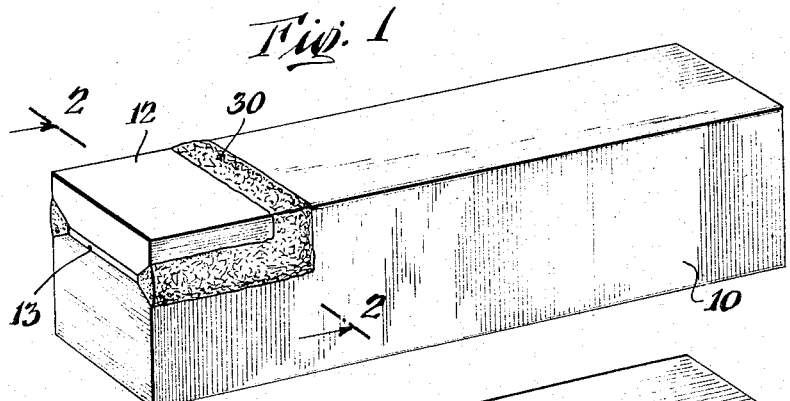
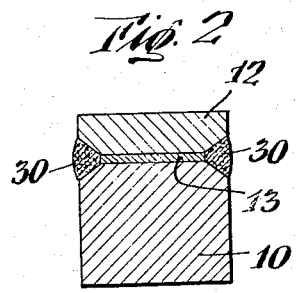
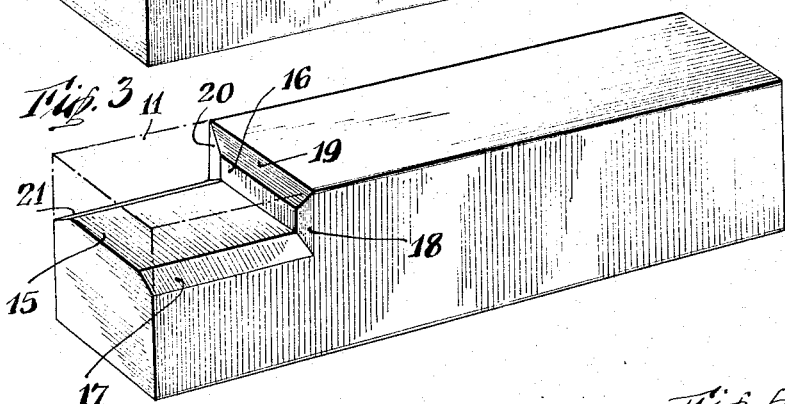
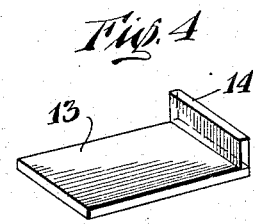
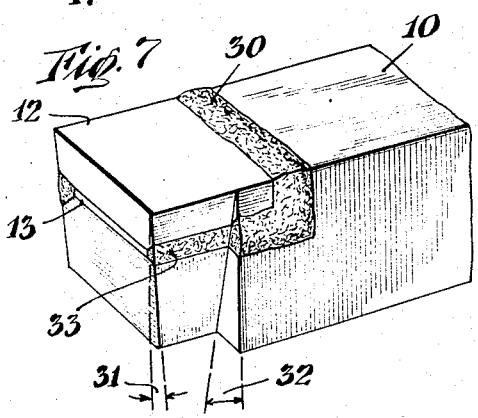
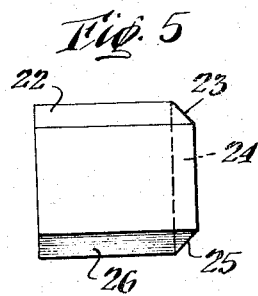
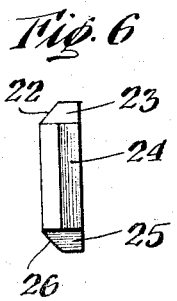
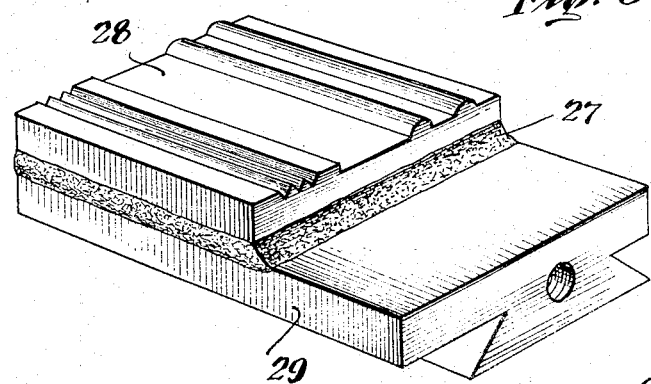
INVENTOR.
Leo J. St. Clair Patented Jan. 19, 1943

2,308,569

UNITED STATES PATENT OFFICE 2,308,569

TOOL AND METHOD FOR MAKING THE SAME

Leo J. St. Clair, East Orange, N. J.

Application July 21, 1941, Serial No. 403,398

9 Claims. (Cl. 76—101)

This invention relates to welding hardened high speed steel to a steel support and more particularly to the production of cutting tools having a hardened high speed steel tip and a shank or support of carbon or alloy steel.

Among the objects of the invention is to provide a process by which a hardened high speed cutting tool tip may be securely attached to a carbon or alloy steel shank or holder without causing fracture of the tool tip.

Another object of the invention is to provide a cutting tool with a hardened high speed steel tip which does not require hardening or heat treatment after the tip is secured to the shank of the tool.

Prior attempts to secure a piece of hardened high speed steel to ordinary carbon or alloy steel invariably caused fracture of the hardened high speed steel as the weld metal cooled down and contracted. Although fractures caused by contraction strains sometimes are not detectable until the tool is put in use they become evident by tool failure. If a high speed steel tip is attached to a shank by the use of welds before the tip is hardened, it is necessary to heat treat the entire cutting tool after the tip and shank have been united in order to get the proper hardness in the tip. The heat treating procedure necessary for hardening the tip, involving high temperatures and quenching, has the effect of harming the physical characteristics of the shank metal so that the shank is often not strong enough to withstand the high stresses and shocks occasioned during use of the tool.

In accordance with the process of my invention, a previously hardened high speed steel tip is securely attached to a shank of carbon or alloy steel without setting up in the tip strains which might cause its fracture, and without requiring any heat treatment after attaching. It is a consequence and also a further object of the invention to conserve the available supply of hardened high speed steel by providing a process for utilizing small pieces of hardened high speed steel for the manufacture of cutting tools which heretofore required large sections of such steel.

Further objects of the present invention will be hereinafter set forth in the accompanying specification and claims and demonstrated by the drawing which shows by way of illustration a preferred embodiment and the principle of my invention and what I now consider the best mode in which I have contemplated applying that principle. Other embodiments of the invention employing the same principle may be used and structural changes made as desired by those skilled in the art within the spirit of the appended claims and without departing from the present invention. The invention makes use of a filler or separator between opposite surfaces of the tip and shank of a cutting tool or other support which has a sufficiently low compressive strength to absorb the deleterious contraction strains caused when the tip is attached to a shank.

Having reference to the drawing:

Figure 1 is a perspective view of a conventional tool which illustrates the application of the invention;

Fig. 2 is a section on line 2—2 of Fig. 1;

Fig. 3 shows a perspective view of the shank illustrated in Fig. 1;

Fig. 4 illustrates pieces which constitute the separators between the tip and shank;

Fig. 5 is a bottom view of a hardened high speed steel tip;

Fig. 6 is an end view of the tip shown in Fig. 5;

Fig. 7 shows the tool of Fig. 1 ground as a right-hand cutting tool with end and side clearances; and Fig. 8 shows the application of the invention in a tool for band-grooving projectiles.

In the process of this invention I utilize any holder or support made from carbon or alloy steels. This material is generally used for tool supports. The support may have any one of the many varieties of forms commonly employed for cutting tools. I have shown in the drawing a type of cutting tool, by way of example only, and it is to be understood that the invention is adaptable for use in the manufacture of tools for all cutting purposes and for forming operations.

In the tool illustrated in Figs. 1 and 7 the support or shank 10 is provided with a recess 11 in which the high speed steel tip 12 is mounted. The tip is pre-hardened before attachment and needs no treatment other than grinding to make ready for use after it is attached to the shank. This tip can be cut from bar stock or obtained from pieces which have been discarded as scrap because of their small dimensions.

A separator consisting of a thin filler or layer of metal having a relatively low compressive strength is inserted between the tip 12 and the shank 10. I have obtained satisfactory results in using sheet copper having a thickness of about three-thousandths of an inch but close adherence to a particular thickness is not necessary to the successful use of the invention. Other metals which are relatively soft and have physical properties similar to copper should also possess equivalent efficacy for carrying out the process of this invention, and I therefore do not wish to be limited to the use of copper. Among the more common of such other metals are, for example, aluminium and brass.

By preference I employ two pieces of metal between different pairs of opposing surfaces although it is apparent that a single piece so shaped to conform to surfaces angularly disposed to one another may be used. Two separate pieces 13 and 14 are illustrated in Fig. 4. One of these is laid upon surface 15 of the shank and the tip 12 is then placed thereon. The second separator 14 is placed between the back end of the tip and the end abutting surface 16 of the shank. The tip is then welded to the shank by locally heating adjacent edge portions of the tip and shank to a welding temperature, while at the same time applying molten metal along the heated junctions of the edge portions, usually by the welding rod of an electric arc.

My experience is, that substantially chamfering the contiguous edges to provide a V-groove into which the welding metal is deposited produces the best results. Such chamfers are shown at 17, 18, 19, 20 and 21 in the shank and at 22, 23, 24, 25 and 26 in the tip. In some cases the natural angles provided betwen the tip and shank obviates the need of chamfering, as for example along the welded jointure at 27 between the tip 28 and its holder 29, as illustrated in Fig. 8. A layer of soft metal rests upon the flat upper surface of the holder under the tip. This particular tool is an end-cutting tool for band-grooving projectiles.

In both of the tools illustrated the grooves formed by chamfers are filled with welding metal 30. The welding of opposite edge portions cause a strong union between the tip and support along these edges, but the superposed areas of the tip, soft metal cushion, and shank are unattached outside of the areas of welded metal.

All adjacent edges of the tip and support need not be welded though they can be if desired. In the tool illustrated in Fig. 1, the end edges are not welded and in the finished tool these edges will appear separated from one another by the layer of softer metal 13 therebetween which can be seen in most cases.

The welding temperature is localized by arc welding and does not reach the cutting portions of the tip and therefore does not affect the hardness of the tip where cutting occurs.

It has been my experience this procedure results in the production of a cutting tool having a tip which is devoid of cracks or defects likely to cause fracture of the tip. Although I do not know with certainty the cause for the favorable results, I am inclined to attribute them to the cushioning effect of the relatively softer metal between the tip and its support and the taking up thereby of the contraction strains which are normally formed in a tip when it is welded to a support of relatively softer steel. It is likely that some internal stresses occur but whether they do or not, their effect is not of sufficient magnitude to cause rupture of the tip while cooling or later during use.

I have described hereinabove the welding together of all of the adjacent edge portions of the tip and supporting shank, with the exception of the edge portions at the end of the tool, as I prefer this practice for commercial purposes, but the full lengths of all of these edge portions need not be welded together. Many tools are adaptable for different uses and when a tool has been ground for a particular use, certain lengths of the welded edge portions may be removed. For example, a right-hand tool will have a portion of the length at its left-hand edge ground away for forming a clearance angle, and the reverse is true with respect to its right-hand edge if the tool is ground as a left-hand tool. However, the full lengths of both left and right-hand edges need not be ground away for any one purpose and there will remain sufficient welded area firmly to secure the tip to the supporting shank. It is obvious therefore, that different pairs of edge portions may be welded so as to leave disunited some pair of opposite edge portions other than at the front end of the tool if the welding is done in anticipation of a particular purpose for the tool.

One effect of chamfering for providing bevelled edge portions in the tip and shank is diagrammatically illustrated in Fig. 7 which shows the tool of Fig. 1, prepared for use as a right-hand tool. An end-clearance angle 31 and a side-clearance angle 32 have been ground. As it appears at 33, the weld metal has not been entirely removed and there still remains a strong union between the tip and shank along the adjacent edges at the cutting side of the tool. This adds to the security of the union between the two members although the remaining unground welded areas on the top and at both sides of the tool would suffice to hold the two together.

It is apparent that with any scarcity of high speed steel, it is extremely important that the supply of this material be conserved and used economically. The process of the present invention is one which makes it possible to employ even small pieces of hardened high speed steel for manufacturing large cutting tools. In some cases the weight of the high speed steel used is only one percent of the total weight of the tool. Formerly this tool was made out of solid high speed steel using one hundred times the amount of high speed steel being used in the process of this invention. In a large majority of cases the high speed steel used amounts to only five to ten percent of the total weight of the tool.

What is claimed is:

1. In combination, a cutting tool comprising a supporting shank and a tool tip, said tip consisting of hardened high speed steel and being welded to said supporting shank only at edge portions of the tip, and a layer of metal between the opposing surfaces of the tip and shank, said layer of metal having a compressive strength lower than that of the tip or shank.

2. In combination, a cutting tool comprising a steel shank, a hardened high speed steel tool tip secured to said shank by welds, and a layer of compressible metal between opposite surfaces of said shank and tip, said layer of metal being unattached to the shank and tip at contiguous surfaces within the limits of the welds.

3. In combination, a cutting tool comprising a supporting shank and a tool tip, said tip consisting of hardened high speed steel and being welded to said supporting shank only at edge portions of the tip, said edge portions having previously been chamfered for providing a groove for receiving welding metal, and a layer of relatively compressible metal between the opposing surfaces of the tip and shank.

4. In combination, a cutting tool comprising a supporting steel shank and a hardened high speed steel tip, said tip being secured to said shank by welds along adjacent edges of the tip and shank, and a thin layer of copper between opposing surfaces of the shank and tip.

5. In combination, a cutting tool comprising a steel shank, a tool hardened high speed steel tip secured to said shank by welds, and a layer of non-ferrous metal between opposite surfaces of said shank and tip, said layer of metal being unattached to the shank and tip at contiguous surfaces within the limits of the welds.

6. The method of securing a tool tip, consisting of hardened high speed steel, to a supporting shank which comprises applying a layer of relatively soft metal upon the surfaces of the shank over which the tip is to be set, placing the tip upon the applied layer of metal, locally heating adjacent edge portions of the tip and shank to a welding temperature, and at the same time applying molten metal along the heated junctions of the edge portions of the tip and shank.

7. The method of securing a tool tip, consisting of hardened high speed steel, to a supporting shank which comprises applying a layer of copper between superposed portions of the tip and supporting shank, and arc welding the tip and supporting shank together along adjacent edge portions of the tip and shank.

8. The method of securing a tool tip, consisting of hardened high speed steel, to a support which comprises chamfering edges of the tip and support which are to be opposite each other when the tip and support are assembled, assembling the tip and support, placing a layer of relatively soft metal between opposing surfaces of the tip and support, locally heating the chamfered edge portions of the tip and support to a welding temperature, and applying molten metal along the heated edge portions of the tip.

9. The method of securing a tool tip, consisting of hardened high speed steel, to a steel support which comprises applying a layer of metal having a comparatively low compressive strength between opposing portions of the tip and support, and welding the tip and support together along adjacent edge portions of the tip and support.

LEO J. ST. CLAIR.